United States Patent
Rolison et al.

(10) Patent No.: US 6,695,986 B1
(45) Date of Patent: Feb. 24, 2004

(54) ELECTROCATALYTIC ENHANCEMENT WITH CATALYST-MODIFIED CARBON-SILICA COMPOSITE AEROGELS

(75) Inventors: Debra R. Rolison, Arlington, VA (US); Michele L. Anderson, Alexandria, VA (US); Rhonda M. Stroud, Washington, DC (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 10/253,602

(22) Filed: Sep. 25, 2002

(51) Int. Cl.[7] .................... B01J 13/00; B01J 21/08; B32B 5/22; C01B 33/16

(52) U.S. Cl. ............... 252/521.3; 252/502; 423/6; 423/449.1; 502/416; 501/12; 516/34; 428/317.9

(58) Field of Search .................. 252/502, 514, 252/521.3; 423/6, 22, 449.1, 592; 502/326, 339, 261, 262, 416, 405; 429/40, 44; 501/12; 516/34, 97, 100, 111; 428/317.9

(56) References Cited

U.S. PATENT DOCUMENTS

| | | | |
|---|---|---|---|
| 5,403,462 A | * | 4/1995 | Lev et al. .............. 204/403.15 |
| 5,429,886 A | | 7/1995 | Struthers |
| 5,453,169 A | | 9/1995 | Callstrom et al. |
| 5,538,931 A | | 7/1996 | Heinrichs et al. |
| 5,601,938 A | | 2/1997 | Mayer et al. |
| 5,744,510 A | | 4/1998 | Pekala |
| 5,767,036 A | | 6/1998 | Freund et al. |
| 5,861,222 A | | 1/1999 | Fischer et al. |
| 5,910,378 A | | 6/1999 | Debe et al. |
| 5,939,220 A | | 8/1999 | Gunner et al. |
| 6,013,313 A | | 1/2000 | Nunan et al. |
| 6,099,965 A | | 8/2000 | Tennent et al. |
| 6,183,894 B1 | | 2/2001 | Adzic et al. |
| 6,239,065 B1 | | 5/2001 | Schultz et al. |
| 6,245,707 B1 | | 6/2001 | Chu et al. |
| 6,290,880 B1 | | 9/2001 | Ryan et al. |
| 6,307,116 B1 | | 10/2001 | Heinrichs et al. |

OTHER PUBLICATIONS

Watanabe et al, The Influence of platinum crystallite size in the electroreduction of oxygen, J. Electroanal. Chem., (1989) V261, P 375–387.*

Frelink et al, "Particle size effect of carbon supported platinum catalysts for the electrooxidation of methanol", (J. Electroanal. Chem., (1995) V382, P 65–72.*

Morris et al, "Silica Sol as a nanoglue: flexible synthesis of composite Aerogels", Science (1999) V284, pp 622–624.*

Anderson et al, "Tailoring Advanced nanoscale materials Through Synthesis of Composite Aerogel Structures", Adv. Eng. Matl. (2000) vol. 2, No. 8, P 481–488.*

Catherine A. Morris, Michele L. Anderson, Rhonda M. Stroud, Celia I. Merzbacher & Debra R. Rolison, "Silica Sol as a Nanoglue: Flexible Synthesis of Composite Aerogels," Science, vol. 284, Apr. 23, 1999, 622–624.

(List continued on next page.)

Primary Examiner—Yogendra N. Gupta
Assistant Examiner—Kallambella Vijayakumar
(74) Attorney, Agent, or Firm—John J. Karasek; Rebecca L. Forman

(57) ABSTRACT

An electrically conductive composite is provided having a mesoporous architecture that improves the accessibility of a nanoscopic catalyst, supported on conductive carbon, to a mass-transported reactant, or substrate, thereby leading to enhanced catalytic activity. In particular, the composite is useful for a new class of fuel-cell electrode architectures based on a composite aerogel that improves the accessibility of a carbon-supported Pt electrocatalyst to methanol (MeOH), leading to higher MeOH oxidation activities than observed at the native carbon supported Pt electrocatalyst. The composite comprises a nanoscopic Pt electrocatalyst, a carbon black electron-conducting support, and a silica aerogel.

7 Claims, 1 Drawing Sheet

OTHER PUBLICATIONS

Michele L. Anderson, Catherine A. Morris, Rhonda M. Stroud, Celia I. Merzbacher & Debra R. Rolison, "Colloidal Gold Aerogels: Preparation, Properties, and Characterization," Langmuir 1999, 15, 674–681.

Michele L. Anderson, Rhonda M. Stoud, Catherine A. Morris, Celia I. Merzbacher & Debra R. Rolison, "Tailoring Advanced Nanoscale Materials Through Synthesis of Composite Aerogel Architectures," Adv. Eng. Mat. 2000, 2, No. 8, 481–488.

Nicola Husing & Ulrich Schubert, "Aerogels—Airy Materials: Chemistry, Structure, and Properties," Angew. Chem. Int. Ed. 1998, 37, 22–45.

A. Henglein, B.G. Ershov & M. Malow, "Absorption Spectrum and Some Chemical Reactions of Colloidal in Aqueous Solution," J. Phys. Chem. 1995, 99, 14129–14136.

Jeffrey W. Long & Debra R. Rolison, "Electroanalytical Characterization of High Surface Area Catalysts and Materials for Power Sources," New Directions in Electroanalytical Chemistry II, J. Leddy, P. Vanysek & M. D. Porter, Eds., The Electrochemical Society: Pennington, NJ, 1999, 99–5, pp. 125–131.

Jeffrey W. Long, Karen E. Swider, Celia I. Merzbacher & Debra R. Rolison, "Voltammetric Characterization of Ruthenium Oxide–Based Aerogels and Other $RuO_2$ Solids: The Nature of Capacitance in Nanostructured Materials," Langmuir 1999, 15, 781–785.

Jeffrey W. Long, Katherine E. Ayers & Debra R. Rolison, "Electrochemical characterization of high–surface–area catalysts and other nanoscale electroactive materials at sticky–carbon electrodes," J. Eleectroanal. Chem. 522 (2002) 58–65.

Masahiro Watanabe, Haruhiko Sei & Paul Stonehart, "The influence of platinum crystallite size on the electroreduction of oxygen," J. Electroanal. Chem., 261 (1989) 375–387.

T. Frelink, W. Visscher & J.A.R. Van Veen, "Particle size effect of carbon–supported platinum catalysts for the electrooxidation of methanol," J. Electroanal. Chem. 382 (1995) 65–72.

A. Pebler, "Transmission Electron Microscopic Examination of Phosphoric Acid Fuel Cell Components," J. Electrochem. Soc., vol. 133, No. 1, Jan. 1986, 9–17.

* cited by examiner

ELECTROCATALYTIC ENHANCEMENT WITH CATALYST-MODIFIED CARBON-SILICA COMPOSITE AEROGELS

BACKGROUND OF THE INVENTION

1. Field of the Invention

The present invention relates generally to composite aerogels and, more particularly, to an electrically conductive, mesoporous architecture that improves access of a catalyst to a reactant thereby leading to enhanced catalytic activity.

2. Background of the Invention

High-surface-area carbon blacks serve as effective solid supports to disperse nanoscale noble metals for use as catalysts (e.g., for hydrogenation or dehydrogenation reactions) and electrocatalysts for oxidation and reduction reactions in fuel cells, and to thereby increase efficiency and reduce costs. In fuel cells, despite high surface areas of the electron-conducting carbon support and effective dispersion of the Pt electrocatalysts, self-agglomeration of the carbon particles within practical electrode structures limits the approach of fuel and oxidant to the active sites, such that all of the electrocatalyst in a fuel-cell electrode cannot be accessed.

This lack of accessibility, also known as the "hidden Pt problem," is evidenced by the fact that current densities in fuel cells do not scale with Pt loadings. Higher weight loadings of noble metal catalysts are then needed in order to achieve complete oxidation of the fuel (i.e., to provide full fuel utilization). This problem may be further compounded by the use of polymeric binders to incorporate the carbon-supported catalytic powder into the desired electrode geometry for the practical power source.

Previous attempts have been made to create conductive carbon-silica composites derived from sol-gel chemistry. These composites were dried under ambient conditions to produce xerogel thin films or monoliths. Composite xerogels suffer certain disadvantages, which are discussed below.

BRIEF SUMMARY OF THE INVENTION

In accordance with the present invention, an electrically conductive composite is provided which affords a number of advantages over previous composites used in fuel cells. For example, as compared to xerogel composites, the electrically conductive composites of the invention are considerably more porous than xerogel composites and provide a continuous transverse and longitudinal porous path.

The electrically conductive composite of the invention comprises a nanoscopic Pt electrocatalyst, a carbon black electron-conducting support, and silica aerogel. The electrically conductive composite exhibits oxidation activity from 0.5 to 100 mA/mg of Pt. In a preferred implementation of the present invention, the carbon support comprises Vulcan carbon. In yet another preferred implementation, the nanoscopic Pt electrocatalyst comprises colloidal Pt.

In accordance with yet another aspect of the present invention, a method of forming an electrically conductive composite is provided. The method includes the initial step of providing a desired amount of catalyst-modified carbon, which is then infused with an about-to-gel colloidal silica sol. Preferably, the amount of sol used is just enough to cover the bed of catalyst-modified carbon. The sol is then allowed to permeate the catalyst-modified carbon. A wet composite gel is then formed which comprises the catalyst-modified carbon and the colloidal silica. The wet composite gel is then dried supercritically (under conditions relevant to a specific pore fluid filling) to form a composite aerogel.

In a preferred method of the present invention, the catalyst-modified carbon comprises VULCAN carbon. The method of the present invention may be used with any pre-formed metal-modified carbon powder, preferably nanoscale-Pt-modified carbon. In an advantageous implementation of the method of the present invention, the method further comprises the step of using argon atmosphere annealing after the composite is formed, which increases Pt particle size to approximately 2–3 nm. Preferably, the annealing step is carried out at approximately 900° C.

Further features and advantages of the present invention will be set forth in, or apparent from, the detailed description of preferred embodiments thereof which follows.

BRIEF DESCRIPTION OF THE DRAWING

The invention will now be described in detail with respect to preferred embodiments with reference to the accompanying drawings, wherein.

DETAILED DESCRIPTION OF THE INVENTION

Figure 1A:
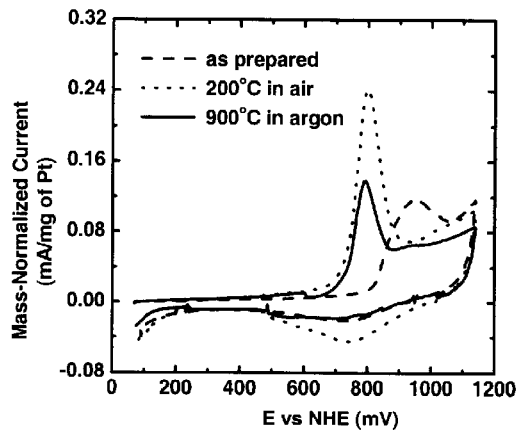
FIGS. 1(a) and (b) are plots showing CO stripping voltammograms at 5 mVs$^{-1}$ in 1 M $H_2SO_4$ at (a) nanoscale Pt in as-prepared colloidal-Pt-modified VULCAN carbon and (b) colloidal-Pt-modified VULCAN carbon-silica composite aerogel after various temperature-atmosphere treatments.
Figure 1B:
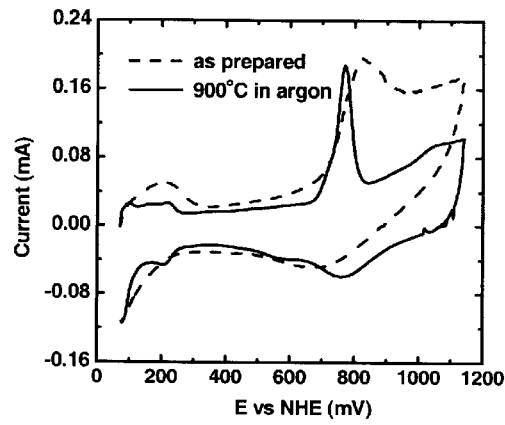

In accordance with one aspect of the present invention, there is provided a method to enhance the electrocatalytic oxidation of methanol (MeOH) by preparing an electrically conductive composite, which includes a mesoporous architecture that improves the accessibility of reactants to carbon-supported Pt catalysts, thereby increasing mass-normalized activity. By using a silica nanoglue approach, a metamaterial is produced, i.e., a nanoscale composite in which each of its phases contributes its distinct chemical and physical properties, but in which the whole provides more functionality than the sum of the individual components. The components of the electroactive metamaterial comprise a nanoscopic Pt electrocatalyst, carbon black as an electron-conducting support, and the bicontinuous nanoscopic networks of pore and solid that exist in a silica aerogel.

Silica sol is used as a "nanoglue" to prepare sol-gel-derived mesoporous composites that introduce the known properties of a guest particulate solid into the porous composite using prior methods known in the art, such as those described by Morris et al., *Science* 284:622 (1999), Anderson et al., *Langmuir* 15:674 (1999), Anderson et al., *Adv. Eng. Mater.* 2:481 (2000) and described in U.S. Pat. No. 6,290,880 (Ryan et al.), and U.S. patent application Ser. No. 09/541,024 (filed Mar. 31, 2000) "Mesoporous Composite Gels and Aerogels" (Rolison et al.), all of which are incorporated herein by reference. The guest solid, dispersed into an about-to-gel silica sol, is immobilized in the threedimensional silica network upon gelation of the silica sol. Neither repeated washings (replacement of the pore-filling liquid) nor supercritical drying (as described in Husing et al., *Angew. Chem., Int. Ed. Engl.* 37:22 (1998)), to produce an aerogel will flush the immobilized particles out of the silica structure, even for particles that are smaller than the average pore size of the continuous mesoporous network. The result is a composite nanoscale matrix that retains characteristics of each of its components, and in particular, the highly porous, high surface area, underdense solid typical of aerogels.

Unlike previous conductive carbon-silica composites derived from sol-gel chemistry, which are dried under ambient conditions to produce xerogel thin films or monoliths, the present electrically conductive composites are dried supercritically to form aerogels. As a result, the present composite is much more porous and retains a greater internal free volume. In addition, the present electrically conductive composite has a continuous transverse and longitudinal porous path, a feature lacking in xerogel composites known in the art.

The electrically conductive composite of the present invention offers a means to design catalytic architectures in which electronic conduction paths to the catalyst, or electrocatalyst, are constructed within a continuous mesoporous volume that ensures rapid diffusional mass transport of external reagents to the network-associated catalyst for enhanced molecular turnover. In particular, the structure of highly porous electrocatalyst-modified carbon-silica composite aerogels facilitates reagent access to the electrocatalyst and increases the reagent-addressable area of the aerogel-immobilized, carbon-supported electrocatalyst. By facilitating reagent access, the present composites display greatly improved catalytic activity over previously used composites.

In one example of a composite according to the present invention, carbon black modified with colloidal platinum is prepared by stirring VULCAN carbon XC-72 (Cabot; ground in a mortar and pestle before use) with multiple aliquots of an ~2-nm Pt sol prepared according to literature procedures from $H_2PtCl_6$ (Alfa-Aesar) described in Henglein et al., *J. Phys. Chem.* 99:14129 (1995), which is incorporated herein by reference. Adsorption of the Pt colloids onto the carbon is visibly tracked by decoloration of the initially light brown sol. Upon saturation (9–10 wt % Pt for adsorption of ~2-nm Pt colloids on XC-72), the colloid-modified carbon (designated as $Pt_{coll}/C$) is rinsed with multiple aliquots of 18 MΩ cm water (Barnstead NanoPure) and air-dried.

Carbon-silica composite aerogels in which the carbon is premodified with Pt are prepared using modifications of previously reported procedures described above. A base-catalyzed silica sol with a gelation time of ~2–3 min is prepared, and the about-to-gel silica sol is dispensed dropwise over an ~1-cm-deep bed of the Pt-modified carbon powder, loosely packed into a polypropylene mold. Addition of the silica sol continues until the silica sol perfuses through the powder bed and is level with the top of the carbon bed. The mold is covered with Parafilm and the composite gel aged for 30 min prior to transfer into acetone. This technique is used to prepare Pt-modified carbon-silica ($Pt/C-SiO_2$) composite gels from both $Pt_{coll}/C$ and commercially available VULCAN carbon-supported Pt (Pt/C; Alfa and E-TEK, 10 wt %).

In one example, the wet gels are rinsed with multiple aliquots of acetone and loaded under acetone into an autoclave (Fisons Bio-Rad E3000). After multiple rinsings with liquid $CO_2$, the pore fluid is taken supercritical to produce the aerogel. Where indicated, samples are annealed under air or flowing argon (2° $min^{-1}$ to temperature, hold for time indicated, cool at 2° $min^{-1}$).

Surface areas and cumulative pore volumes are determined from $N_2$ physisorption data (Micromeritics ASAP 2010 system) using the Brunauer-Emmett-Teller (BET) method and the Barrett-Joyner-Halenda (BJH) method, respectively. High-resolution transmission electron microscopy (HRTEM; Hitachi H-9000 300-kV microscope) of the Pt-modified carbon and the $CO-SiO_2$ composite aerogels is obtained on samples prepared by pipetting acetone suspensions of the powdered samples onto lacey-carbon-film support grids.

The cyclic voltammetric and chronoamperometric measurements of Pt/C and $Pt/C-SiO_2$ composite aerogels are obtained using the sticky-carbon method, disclosed in Long, J. W. et al., *New Directions in Electroanalytical Chemistry II*, Leddy et al., Eds.; PV 99-5, Electrochemical Society: Pennington, N.J., p.125 (1999), Long, J. W. et al., *Langmuir*, 15:780 (1999), and Long, J. W. et al., *J. Electroanal. Chem.*, 522:58 (2002), incorporated herein by reference. Submilligram quantities of the powder are transferred quantitatively onto the surface of an acetylene black/eicosane (~35:65 mass ratio) sticky-carbon electrode for electroanalysis. The immersed sticky-carbon-mounted sample is equilibrated in Ar-purged electrolyte for at least 30 min prior to measurement (Radiometer Analytical VoltaLab 4 potentiostat). All electrochemical experiments are performed under Ar using a Pt auxiliary electrode; all potentials are measured versus a saturated calomel reference electrode (SCE) and reported versus normal hydrogen (NHE).

Stripping analysis of CO is used to evaluate the number and character of active surface platinum sites. Each analysis consists of an initial voltammogram, introduction of CO (by bubbling through a frit directly into the electrolyte solution for several minutes, followed by purging with Ar to remove excess CO), and a stripping voltammogram. The electrode potential is held at −200 mV vs SCE during introduction of CO.

Supercritical processing of the Pt-modified carbon-silica ($Pt/C-SiO_2$) composites produces aerogels that retain the high surface area and much of the mesoporosity of native silica aerogel, as shown in Table 1. The composite aerogel exhibits electronic conductivity, which derives from interconnected carbon particles throughout the mesoporous architecture; the typical resistance of a $C-SiO_2$ composite aerogel is <200 kΩ across a 1-cm-diameter sample.

TABLE 1

BET surface areas and pore volumes of carbon-silica composite aerogel and its components.

| | Weight % of guest | Pore volume ($cm^3/g$) | BET surface area ($m^2/g$) |
|---|---|---|---|
| Silica aerogel | N/A | 4.44 | 824 |
| Vulcan carbon (VC) | N/A | 0.83 | 232 |
| Pt-mod. VC-silica aerogel | 10.7 | 1.55 | 731 |

This procedure is general and can be used for any preformed metal-modified carbon powder, either commercially available or prepared in-house. Commercial carbon-supported noble metal catalysts are typically prepared by impregnating the carbon black support with a salt or complex of the desired metal, which is then chemically reduced.

Carbon-supported catalysts derived from impregnation techniques generally exhibit a distribution of particle sizes, and, more importantly, physically isolate some of the noble metal catalyst. The metal-base precursors can penetrate the micropores of the carbon support, where, upon reduction, particles are formed that are accessible to external reagents only at the micropore opening.

An alternate, less-often-applied method for preparing carbon-supported catalysts is to adsorb preformed metal particles from a colloidal suspension onto the carbon support as described in Watanabe et al., *J. Electroanal. Chem.* 261:375 (1989) and Frelink et aL, *J. Electroanal. Chem.* 382:65 (1995), both of which are incorporated herein by reference. The use of preformed metal colloids permits selection of the metal particulate size, e.g., large enough (~2 nm) to prevent penetration of the particle into the micropores of the carbon. Monodisperse.metal sol preparations are available, so essentially all of the metal colloids can be optimally presized for the highest activity for a specific reaction. In that colloid-modified VULCAN-carbon supporting ~2 nm Pt particles saturates at loadings of 9–10 wt %, while Pt-impregnated-VULCAN carbon can be obtained at loadings up to 40 wt %, it is clear that the surface area and pore volume associated with the micropores of Vulcan carbon entrain more than 50% of the supported Pt electrocatalyst.

The electrically conductive composite was prepared using both in-house colloid-modified VULCAN carbon and commercially available VULCAN carbon-supported Pt nanoparticles. High-resolution transmission electron microscopy (HRTEM) verifies that the size of the supported metal particles is unaltered by gluing the colloid-modified carbon within a silica-based composite aerogel.

Figure 2:
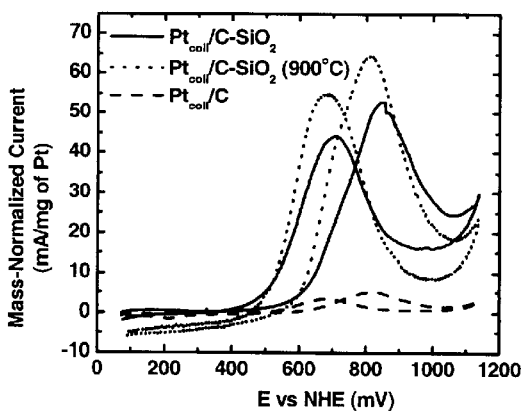
FIG. 2 is a plot of the cyclic voltammetric oxidation of MeOH in acid electrolyte at Pt-colloid-modified carbon powder and colloid-modified carbon-silica composite aerogels.

The Pt in $Pt_{coll}/C-SiO_2$ composite aerogels remains accessible to external reagents such as $H^+/H_2O$, CO, and MeOH, as determined by cyclic voltammetric studies. The nanoscale size of the supported Pt colloids seen by HRTEM is further confirmed by the weak hydrogen adsorption/desorption and oxide formation/stripping features observed in acid electrolyte (1 M $H_2SO_4$) for $Pt_{coll}/C$ and $Pt_{coll}/C-SiO_2$ composite aerogels, as shown in FIG. 2, as well as by the shift to more positive potentials for oxidation of adsorbed CO (see Table 2) than that seen at polycrystalline Pt in sulfuric acid electrolyte (~0.73 V vs the reversible hydrogen electrode).

The voltammetric response observed for the composite aerogel is qualitatively similar to that for $Pt_{coll}/C$ powder, but the potential of the CO stripping peak shifts by ~100 mV to more negative potentials (less positive overpotential) for Pt in the $Pt_{coll}/C-SiO_2$ composite aerogel relative to Pt in $Pt_{coll}/C$. The hydrogen adsorption/desorption and oxide formation/stripping features are also more resolved, which indicates that the surface character of the Pt is more like Pt metal after formation and supercritical processing of the carbon-silica wet composite gel. It is plausible that the solvent-processing steps (aqueous/alcohol-based sol-gel chemistry, acetone and $CO_2(l)$ washings, and extraction from supercritical $CO_2$) remove some of the surface-adsorbed species ($Cl^-$, oxalate, hydroxide) that prevent colloid-colloid aggregation during synthesis of the Pt sol.

The area under the CO stripping peak can be used to quantify the active Pt surface sites (see Table 2). The Pt in $Pt_{coll}/C-SiO_2$ composite aerogel has 3-fold more available surface sites than does Pt in $Pt_{coll}/C$. Because the HRTEM analyses show that the size of the carbon-supported colloidal Pt does not increase (or decrease) after sol-gel chemistry and supercritical fluid processing, the increase in surface sites indicates that the Pt surface in the composite aerogel is more available for electroreaction (i.e., cleaner) than the surface of Pt in the colloid-modified carbon.

TABLE 2

Peak potential for CO stripping from Pt nanoparticles, Pt particle size, and quantitation of the ratio of surface Pt to total Pt from Vulcan Carbon-supported Pt and Pt/C-silica composite aerogels.

| Sample treatment | Average size of supported Pt (nm)[a] | CO stripping peak potential (V vs. NHE) | Ratio of surface pt to total Pt[b] |
|---|---|---|---|
| $Pt_{coll}/C$-as prepared | 1.7 ± 0.3 | 0.94 | 0.10 |
| -heated in air at 200° C. (2 h) | 2.7 ± 0.1 | 0.80 | 0.059 |
| -heated in Ar at 900° C. (10 min) | 3.8 ± 1.3 | 0.79 | 0.030 |
| $Pt_{coll}/C-SiO_2$ composite aerogel-as prepared | 1.8 ± 0.7 | 0.83 | 0.30 |
| -heated in Ar at 900° C. (10 min) | 3.0 ± 1.3 | 0.77 | —[c] |
| Pt/C (E-TEK)-as received | 1.9 ± 0.5[d] | n.d. | n.d. |
| -heated in Ar at 900° C. (10 min) | 3.6 ± 1.0[d] | n.d. | n.d. |

The native $Pt_{coll}/C$ powder and $Pt_{coll}/C-SiO_2$ composite aerogel also exhibit related electrochemical responses after heating (see FIG. 2). The potential of the CO stripping peak again occurs at a less positive value in the composite aerogel than in the native powder, although the shift is less, pronounced. (~30 mV) after heating under flowing argon. The quantitative data obtained for CO stripping indicate that heating the colloid-supported carbon does sinter the Pt to larger particle sizes, as seen by the HRTEM analyses, and that heating in air to even 200° C. is deleterious to maintaining the carbon-supported Pt at a size of ~2 nm.

In previous studies it has been observed that oxidation activity was 2–3 times higher for oxidation of methanol at carbon-supported catalysts that were derived from colloidal techniques as contrasted with catalysts prepared using either impregnation or ion-exchange methods. A more pronounced increase in activity for MeOH electrooxidations—orders of magnitude—occurs upon incorporating either Pt/C or $Pt_{coll}/C$ electrocatalysts into an aerogel architecture (see FIGS. 2 and 3). The consistency of the slope of the Tafel plot (derived from log current-overpotential data) at ~74 $mV^{-1}$ for all the Pt-based samples indicates that the rate-determining step for electrooxidation of MeOH remains unchanged, whether the carbon-supported Pt is prepared by impregnation or adsorption of preformed colloids or whether the carbon-supported Pt is incorporated within a silica aerogel. The texture of the 10 wt % Pt/C received from E-TEK was coarse and granular—completely dissimilar to the flowing, talc-like texture of the as-received VULCAN carbon XC-72, colloid-modified XC-72, or the 10 wt % Pt/C received from Alfa. The E-TEK Pt/C produced poor quality composite aerogels, so the data for these materials is not reported.

The $Pt_{coll}/C-SiO_2$ composite aerogel expresses three physical factors that lead to such high oxidation activity (10-times more active per gram of Pt than is the $Pt_{coll}/C-SiO_2$ used to create the composite aerogel (see FIG. 3)). The:first factor arises from the fact that ~2-nm Pt colloids cannot enter the micropores in the carbon, which increases the fraction of surface Pt sites exposed to reactant.

The second factor is conferred by the fact that the architecture defines a continuous mesoporous volume that permits facile mass transport of fuel molecules past the Pt electrocatalyst. The third factor arises because of the surface activity of silica colloids. VULCAN carbon contains heterocyclic sulfur that preferentially associates with colloidal particles and binds silica colloids so strongly that carbon-silica composite gels soaked in colloidal metal sols, including ~2-nm Pt, do not adsorb the metal nanoparticles. The bed expansion produced as surface-active silica sol infuses into the carbon bed and breaks up agglomerates then freezes in place upon gelation of the silica sol. Supercritical drying of the gel ensures that the aerogel architecture, as defined by its bicontinuous solid and pore networks, exhibits more of the active surface area of the carbon-supported electrocatalyst to external reagents per unit time than in the native catalyst-modified carbon powder.

The HRTEM studies discussed above, demonstrate that the colloid-modified carbon presents a more homogeneously dispersed and sized Pt to the reaction interphase. In the colloid-modified carbon, 1.7-nm Pt colloids decorate the surface of micrometer-sized agglomerates of the nanoscopic carbon black. In the $Pt_{coll}/C$—$SiO_2$ composite aerogel, these carbon aggregates are broken up and the individual carbon particles, as well as the supported Pt colloids, are more homogeneously dispersed, despite no further mechanical grinding of the carbon-supported Pt prior to incorporation into the composite aerogel. A similar reduction in carbon particulate aggregation as described in Pebler, A., *J. Electrochem. Soc.* 133:9 (1986) for carbon-Teflon composites.

Figure 3:
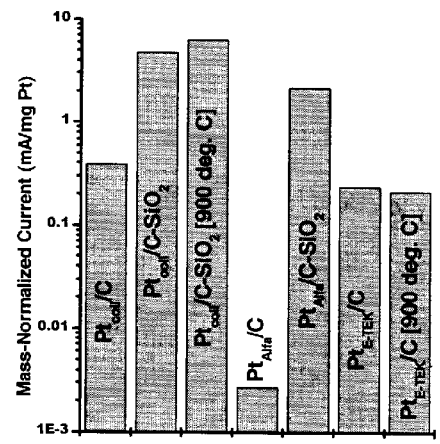
FIG. 3 is a histogram on a logarithmic scale of electrocatalytic activity for the oxidation of MeOH in acid electrolyte at Pt-modified carbon powder and Pt-modified carbon-silica composite aerogels.

As indicated by the activity series of FIG. 3, the activity of Pt-modified carbon-silica composite aerogels can be affected by temperature-atmosphere treatments. The fuel-cell literature indicates that the optimal Pt particle size for reactions in the $H_2/O_2$ fuel cell is ~3 nm, which is larger than the size of our as-formed colloidal Pt particles. On the basis of HRTEM, Pt particle migration during heating of colloidal Pt-modified VULCAN carbon is sufficiently limited that the Pt particles grow to no more than ~3 nm in size, even after heating to 900° C. (Table 2). The growth of Pt in $Pt_{coll}/C$—$SiO_2$ composite aerogels upon heating to 900° C. is limited even further. Any sulfur moieties that are not already blocked by Pt colloids in $Pt_{coll}/C$ will be free to adsorb silica colloids during synthesis of the $Pt_{coll}/C$—$SiO_2$ composite gel, which will interrupt the ability of heat-labile Pt to sinter. Accordingly, Pt particles grow to ~3 nm in size, which brings the size of the Pt particles into a highly catalytically active range for standard fuel-cell reactions. This increase in Pt particle size from 1.8 nm to ~3 nm in the 900° C.-annealed colloidal-Pt-modified carbon-silica composite aerogel produces a further increase in MeOH oxidation activity, as shown in FIG. 3. The Pt on E-TEK Pt/C is electrochemically inactive if heated in dry air to >200° C., but Pt supported on electrodesulfurized carbon is not electrochemically poisoned by heating in dry air to >200° C.

The use of sol-gel chemistry and supercritical processing to create carbon-silica composite aerogels produces a multifunctional architecture that incorporates an electrically wired electrocatalyst within a mesoporous volume that permits ready access of reactant to the supported electrocatalyst and thereby enhances the activity of the supported electrocatalyst by orders of magnitude. The ability to control, or at the least to limit, the siting and final working size of catalyst particles to optimal or near-optimal conditions for a particular electrode construction is also crucial to reducing the amount of expensive noble metals required in fuel cells. It is now demonstrated that such control is achieved with nanostructured architectures-built using composite aerogels.

Carbon-silica composite aerogels in which the carbon has been modified with electrocatalysts can serve as the basis to improve the activity of anodes for oxidation of fuels and cathodes for reduction of oxygen. The technique will be easily generalized to Pt-Mo electrocatalysts of interest in reformate-fed fuel cells and Pt-RuOxHy-based or other multicomponent Pt-based alloyed electrocatalysts for direct methanol oxidation. The aerogel-based catalytic architecture is conceptually and practically expandable to any supported nanoscale catalyst, particularly those on supports that are prone to self-aggregation and agglomeration.

Although the invention has been described above in relation to preferred embodiments thereof, it will be understood by those skilled in the art that variations and modifications can be effected in these preferred embodiments without departing from the scope and spirit of the invention.

What is claimed is:

1. A method of forming an electrically conductive composite, said method comprising the steps of:
   a) providing a loosely packed bed of a desired amount of catalyst-modified carbon powder;
   b) dispensing about-to-gel colloidal silica over the catalyst-modified carbon bed;
   c) allowing the silica sol to permeate the catalyst-modified carbon bed;
   d) allowing the silica sol to completely perfuse throughout the catalyst-modified carbon bed;
   e) forming a wet composite gel comprising the catalyst-modified carbon colloidal silica;
   f) drying the wet composite gel at a supercritical temperature for a specific pore fluid filling in order to form a composite aerogel.

2. The method according to claim 1, wherein the catalyst-modified carbon is a preformed metal-modified carbon powder.

3. The method according to claim 1, wherein the catalyst modified carbon is nanoscale-Pt-modified carbon.

4. The method according to claim 3, wherein the Pt particle size is about 2–3 nm.

5. The method according to claim 1, wherein the silica sol used is a sufficient amount to penetrate and just cover the bed of catalyst-modified carbon.

6. The method according to claim 4, further comprising the step of using an argon atmosphere annealing step after forming the composite aerogel to increase Pt particle size.

7. The method according to claim 6, wherein the annealing step is carried out at 900° C.

* * * * *